US012795271B2

(12) United States Patent
Lee et al.

(10) Patent No.: US 12,795,271 B2
(45) Date of Patent: Nov. 10, 2026

(54) NETWORKING SWITCHING DEVICES AND METHODS THEREOF

(71) Applicant: MARVELL ASIA PTE LTD, Singapore (SG)

(72) Inventors: Whay Sing Lee, Santa Clara, CA (US); Arash Farhoodfar, Santa Clara, CA (US); Volodymyr Shvydun, Santa Clara, CA (US); Michael Duckering, Santa Clara, CA (US)

(73) Assignee: MARVELL ASIA PTE LTD, Singapore (SG)

(*) Notice: Subject to any disclaimer, the term of this patent is extended or adjusted under 35 U.S.C. 154(b) by 233 days.

(21) Appl. No.: 18/439,295

(22) Filed: Feb. 12, 2024

(65) Prior Publication Data

US 2024/0223924 A1 Jul. 4, 2024

Related U.S. Application Data

(63) Continuation of application No. 17/684,815, filed on Mar. 2, 2022, now Pat. No. 11,902,721, which is a continuation of application No. 17/011,941, filed on Sep. 3, 2020, now Pat. No. 11,272,270.

(51) Int. Cl.

| | |
|---|---|
| ***H04B 10/516*** | (2013.01) |
| ***H04J 14/02*** | (2006.01) |
| ***H04L 1/00*** | (2006.01) |
| ***H04Q 11/00*** | (2006.01) |

(52) U.S. Cl.

CPC ....... *H04Q 11/0062* (2013.01); *H04B 10/516* (2013.01); *H04J 14/0307* (2023.08); *H04L 1/0003* (2013.01); *H04L 1/0045* (2013.01); *H04L 1/0061* (2013.01); *H04Q 11/0005* (2013.01); *H04Q 2011/0016* (2013.01); *H04Q 2011/002* (2013.01); *H04Q 2011/0088* (2013.01); *H04Q 2201/02* (2013.01)

(58) Field of Classification Search

CPC .............. H04B 10/516; H04Q 2201/02; H04L 1/0003; H04J 14/02

USPC .................................................... 398/43, 183

See application file for complete search history.

(56) References Cited

U.S. PATENT DOCUMENTS

| | | | | |
|---|---|---|---|---|
| 6,151,336 | A * | 11/2000 | Cheng | H04J 3/22 370/535 |
| 6,226,296 | B1 | 5/2001 | Lindsey et al. | |
| 6,396,853 | B1 * | 5/2002 | Humphrey | H04L 47/50 370/395.42 |
| 6,430,201 | B1 * | 8/2002 | Azizoglu | H04J 14/025 370/535 |
| 7,734,183 | B2 * | 6/2010 | Whitehead | G02B 6/4246 398/140 |
| 7,920,791 | B2 | 4/2011 | Sakai et al. | |

(Continued)

OTHER PUBLICATIONS

Chinese Office Action and Search Report for Chinese Application No. 202111032249.7 dated Apr. 29, 2026.

*Primary Examiner* — Li Liu

(57) ABSTRACT

A communication device includes a plurality of communication pipelines configured to receive respective input data streams and a multiplexer coupled to the plurality of communication pipelines. The multiplexer is configured to generate an output data stream by combining the input data streams and to insert one or more special characters into the output data stream in response to a fault with one of the communication pipelines.

19 Claims, 6 Drawing Sheets

(56) References Cited

U.S. PATENT DOCUMENTS

| | | | | |
|---|---|---|---|---|
| 8,009,985 | B1 | 8/2011 | Roberts et al. | |
| 2002/0080809 | A1* | 6/2002 | Nicholson .......... | H04N 21/2365 348/E7.086 |
| 2003/0095594 | A1* | 5/2003 | Laksono .............. | H04N 19/172 375/E7.181 |
| 2003/0192006 | A1* | 10/2003 | Coakeley ............ | H03M 13/098 714/776 |
| 2004/0202205 | A1* | 10/2004 | Sheth .................... | H04L 45/245 370/539 |
| 2008/0019706 | A1* | 1/2008 | Levinson ............. | H04N 21/615 725/121 |
| 2008/0056721 | A1 | 3/2008 | Mori | |
| 2013/0083810 | A1 | 4/2013 | Ghiasi et al. | |
| 2017/0187555 | A1* | 6/2017 | Tiruvur ................... | H04L 27/04 |
| 2019/0052513 | A1* | 2/2019 | Farhoodfar ........... | H04L 12/427 |
| 2020/0014990 | A1 | 1/2020 | Tochio et al. | |
| 2021/0126707 | A1* | 4/2021 | Tanaka ............... | H04B 10/0795 |

* cited by examiner

400

NETWORKING SWITCHING DEVICES AND METHODS THEREOF

CROSS-REFERENCE TO RELATED APPLICATIONS

The present disclosure is a continuation of U.S. patent application Ser. No. 17/684,815 filed on Mar. 2, 2022 (now U.S. Pat. No. 11,902,721 issued Feb. 13, 2024) which is a continuation of U.S. patent application Ser. No. 17/011,941 filed on Sep. 3, 2020 (now U.S. Pat. No. 11,272,270 issued Mar. 8, 2022). The entire disclosures of the applications referenced above are incorporated herein by reference.

BACKGROUND

The present invention is directed to data communication systems and techniques thereof.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. For example, a social network like Facebook processes than terabytes of data daily. With such high demands on data storage and data transfer, existing data communication systems need to be improved to address these needs.

For high-speed data communication applications, it is important to support many types of network entities, including legacy devices that communicate using older and different communication protocols. Over the past, various conventional techniques have been proposed and implemented, but unfortunately they have been inadequate. It is thus desirable to have new and improved systems and methods.

SUMMARY

The present invention is direct to data communication. In a specific embodiment, multiple independent data streams, which are at a first data rate, are transcoded by separate communication pipelines into data blocks. The data blocks, associated with these separate and independent data streams, are multiplexed with alignment markers to generate an output data stream. The output data stream is transmitted at a second data rate, which is higher than the first data rate.

According to an embodiment, the present invention provides a communication device, which includes a first communication interface configured to receive a first data stream from a first input communication lane and a second data stream from a second communication lane. The first data stream is characterized by a 25 G data rate. The device also includes a first communication pipeline configured to process the first data stream and may include a first decoder and a first buffer and a first transcoder. The first buffer is configured to insert or delete characters to the first data stream to compensate a data rate difference. The first transcoder is configured to provide a first transcoded data stream in response to a first data request. The device also includes a second communication pipeline configured to process the second data stream and provide a second transcoded data stream. The device also includes an alignment marker module configured to generate alignment markers for transcoded data streams. The transcoded data streams include the first data stream. The device also includes a calendar module configured to generate an output data stream by multiplexing transcoded data streams and the alignment markers. The transcoded data streams include the first transcoded data stream and the second transcoded data stream. The calendar module being further configured to generate first data request. The device also includes a second communication interface configured to output the output data stream at a 100 G data rate.

According to another embodiment, the present invention provides a data communication system, which includes a first network entity configured to provide a first data stream. The first data stream is characterized by a first encoding scheme and a first data rate. The system also includes a second network entity configured to provide a second data stream. The second data stream is characterized by a second encoding scheme. The second data stream is independent from the second data stream. The system also includes a first switching device may include a controller and a plurality of communication pipelines. The plurality of communication pipelines includes a first pipeline and a second pipeline. The controller is configured to initialize the first pipeline for the first data stream and the second pipeline for the second data stream. The first pipeline may include a first buffer and a first transcoder. The first transcoder is configured to provide a first plurality of data blocks based on the first data stream in response to a first data request signal, the second pipeline being configured to generate a second plurality of data blocks. The first switching device may include a calendar module configured to generate an output data stream by multiplexing at least the first plurality of data blocks and the second plurality of data blocks. The system also includes a communication link configured to transmit the output data stream at a second data rate, the second data rate being higher than the first data rate.

According to yet another embodiment, the present invention provides a communication method, which includes receiving a first data stream at a first data rate. The method also includes receiving a second data stream at a second data rate. The method also includes decoding the first data stream using a first pipeline. The method also includes decoding the second data stream using a second pipeline. The method also includes storing the decoded first data stream at a first buffer. The method also includes storing the decode second data stream at a second buffer. The method also includes determine a difference between an input rate and output rate associated with the first buffer. The method also includes compensating the decoded first data stream at the first buffer if the difference is non-zero. The method also includes transcoding the decode first data stream to generate a first plurality of blocks. The method also includes transcoding the decoded second data stream to generate a second plurality of blocks. The method also includes generating an output data stream by multiplexing the first plurality of blocks and the second plurality of blocks. The method also includes transmitting the output data stream.

It is to be appreciated that embodiments of the present invention provide many advantages over conventional techniques. Among other things, switching devices and mechanisms of according to embodiments of the present invention support a wide range of existing network clients, such as computer systems, servers, routers, internet switches, and others. The ability to utilize older systems allows for leveraging new technologies and preserving prior equipment investments. As an example, 25 G Ethernet (IEEE standards 802.3by) technology has been in the market for many years. In more recent years, technology has advanced to enable 100

Gb/s per lambda optical connections, such as PAM CWDM. It is desirable to allow 25 G only devices to work with faster connections such as CWDM. It is to be understood that the terms "25 G" and "100 G" refer to communication data rate, respectively, at about 25 Gbps and 100 Gbps, which can be accomplished using different types of network protocol or encoding schemes. Among other benefits, embodiments of the present invention afford 25 G network clients the ability to connect to (newer) cost-effective and power-efficient 100 G networks.

Embodiments of the present invention can be implemented in conjunction with existing systems and processes. For example, embodiments of the present invention can be manufactured using existing equipment and fabrication techniques. Additionally, since an objective of the present invention it to provide a high level of compatibility, devices and method of the present invention are capable of working with a large range of devices and systems. There are other benefits as well.

The present invention achieves these benefits and others in the context of known technology. However, a further understanding of the nature and advantages of the present invention may be realized by reference to the latter portions of the specification and attached drawings

BRIEF DESCRIPTION OF DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DESCRIPTION

Figure 1:
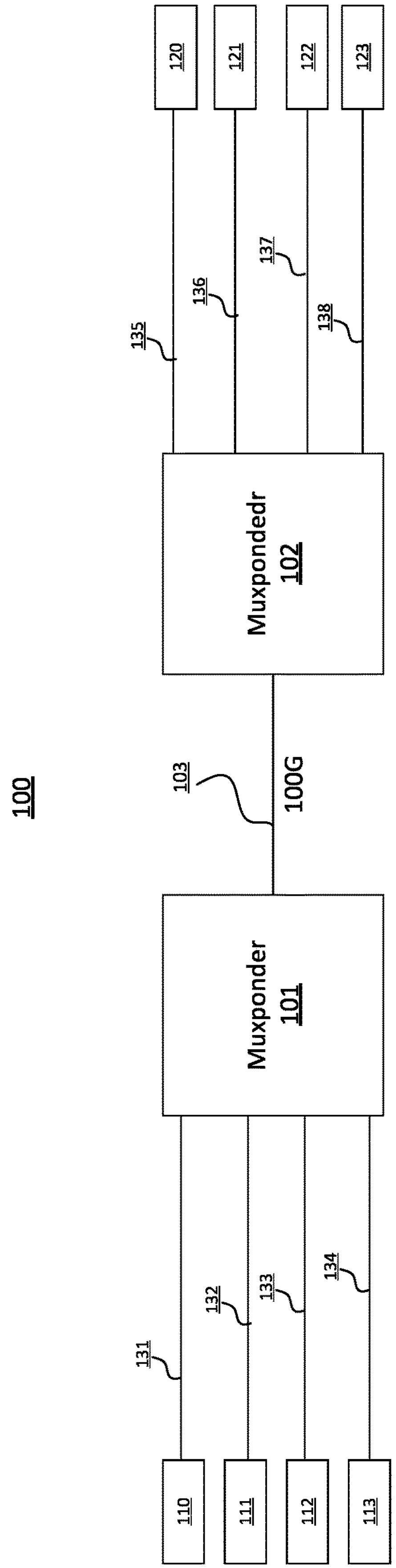
FIG. 1 is a simplified block diagram illustrating a communication system according to an embodiment of the present invention.

The present invention is direct to data communication. In a specific embodiment, multiple independent data streams, which are at a first data rate, are transcoded by separate communication pipelines into data blocks. The data blocks, associated with these separate and independent data streams, are multiplexed with alignment markers to generate an output data stream. The output data stream is transmitted at a second data rate, which is higher than the first data rate.

As mentioned above, existing techniques have been inadequate in supporting certain types of communication devices, especially legal devices that cannot be updated to operate with newer communication protocol. For example, many computers, storage servers, and networking switches and routers rely on the ethernet standard for networking communications. As networking technology advances, it is desirable to allow older servers and switches to work with newer and faster networks and communication standards thereof. The ability to utilize older systems allows for leveraging new technologies and preserving prior equipment investments. As an example, 25 G Ethernet (e.g., IEEE standards 802.3by) technology has been in the market for many years. In more recent years, technology has advanced to enable 100 Gb/s per lambda (e.g., 100 G single lambda traffic stream) optical connections, such as PAM CWDMCWDM. It is desirable to allow 25 G only devices to work with faster connections such as CWDMCWDM. It is to be understood that the terms "25 G" and "100 G" refer to communication data rate, respectively, at about 25 Gbps and 100 Gbps, which can be accomplished using different types of network protocol or encoding schemes.

According to various embodiments, the present invention enables multiple (e.g., two to four) independent legacy 25 G Ethernet ports to be multiplexed together, such that they can be carried over a single 1×100 Gb/s CWDMCWDM link (e.g., a long-haul connection) and transparently de-multiplexed back to multiple the independent legacy 25 G Ethernet ports.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified block diagram illustrating a communication system 100 according to an embodiment of the present invention. This diagram is merely an example, which should not unduly limit the scope of the claims. One of ordinary skill in the art would recognize many variations, alternatives, and modifications. Communication system 100 includes muxponder 101 and muxponder 102 are connected to each other via communication link 103. For example, the term "muxponder" refers to a switching device in a communication system that provides communication interfaces (including optical communication interfaces) and provide multiplexing for sub-rate client. In various implements, a muxponder according to embodiments of the present invention multiplex data received from clients that operate at 25 G and transmit the multiplexed data through optical communication link at 100 G.

As an example, muxponder 101 is coupled to network clients 110-113 respectively via communication links 131-134, which are 25 G communication links. Muxponder 101 multiplexes data from clients 110-113 and transmit the multiplexed data at a data rate of 100 G via optical communication link to muxponder 102. For example, clients 110-113 can be various types of network entities, such as network switches, routers, computers, storage servers, serializer/deserializers, and other types of network entities. Muxponder 102 performs de-multiplexing and other steps to provide data to network clients 120-123 respectively via communication links 135-138. It is to be noted that network clients are independent from one another, and muxponders 101 and 102 maintain the independent data streams for their respective clients; the process of transmitting multiplexed 25 G data at a rate of 100 G via optical communication link (as illustrated in system 100) is more than merely aggregating data at lower rate to a higher rate, as independence and integrity of 25 G data lanes are maintained.

For example, network clients 110-113 each comprises a 1×25 G ethernet port. Network clients 110-113 may use different communication protocols. Muxponder 101 includes four 25 G Ethernet communication interfaces for connecting to network clients 110-113. It is to be understood that while muxponder 101 is shown to be connected to four network clients, muxponder 101 may be coupled to a single network client, and it is still needed, since only connected network client still relies on muxponder 101 to transmit its data through the 100 G optical communication link 103. Muxponder 101 is connected to muxponder 102 via 100 G CWDM link, for example. Muxponder 102 also includes its four 25 G ethernet interfaces for connecting to network entities 120-123. For example, one or more network clients as shown in FIG. 1 could be legacy equipment that lacks the capability of utilizing communication link 103 (e.g., 100 G PAM CWDM or other formats). In certain implementations, data in CWDM4 MSA encoding are mapped to DR1 coding. For example, the process of multiplexing 25 G data streams can be synchronous or asynchronous, depending on the implementation. For example, communication link 103 provides high data rate and long-haul capability for the network clients.

Figure 2:
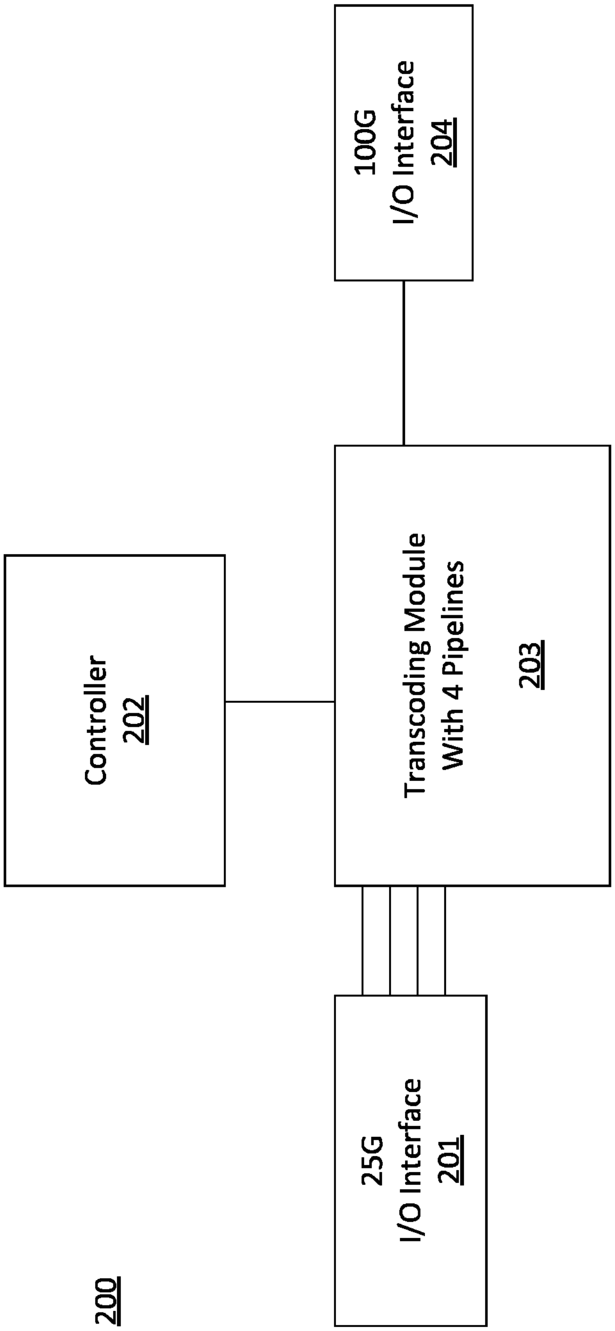
FIG. 2 is a simplified block diagram illustrating a switching device according to an embodiment of the present invention.

FIG. 2 is a simplified block diagram illustrating a switching device according to an embodiment of the present invention. This diagram is merely an example, which should not unduly limit the scope of the claims. One of ordinary skill in the art would recognize many variations, alternatives, and modifications. For example, switching device 200 includes a 25 G interface 201 that is capable to connected to number of 25 G network links. In various embodiments, switching device 200 is used to implement muxponders 101 and 102. For example, while FIG. 2 shows four links, there might be a different number of 25 G links for an output data rate of 100 G at interface 204; when there are fewer than four links and the total data rate is less than 100 G, switching device 200 inserts or remove special characters to compensate, and when there are more than four 25 G links connected, switching device 200 only allows four 25 G links to be connected at the same time to avoid exceeding 100 G data rate at the output. In various embodiments, switching device 200 uses special characters to indicate (e.g., to the corresponding downstream devices, such as 25 G link partner at the other end) that the 25 G device on the transmitting end is not present or not in proper operation. For example, the special character "Local Fault" may be used for this purpose.

The 25 G links—and their respective network clients—are independent, and they could be used to transport data using different communication protocols. Transcoding module 203, which provides four communication pipelines that can transcode and multiplex up to four 25 G communication links, can be configured to accommodate different types of communication protocols. For example, via controller 202, a user or network administrator can set up the four pipelines to work with communication protocols of the four 25 G links.

Figure 3:
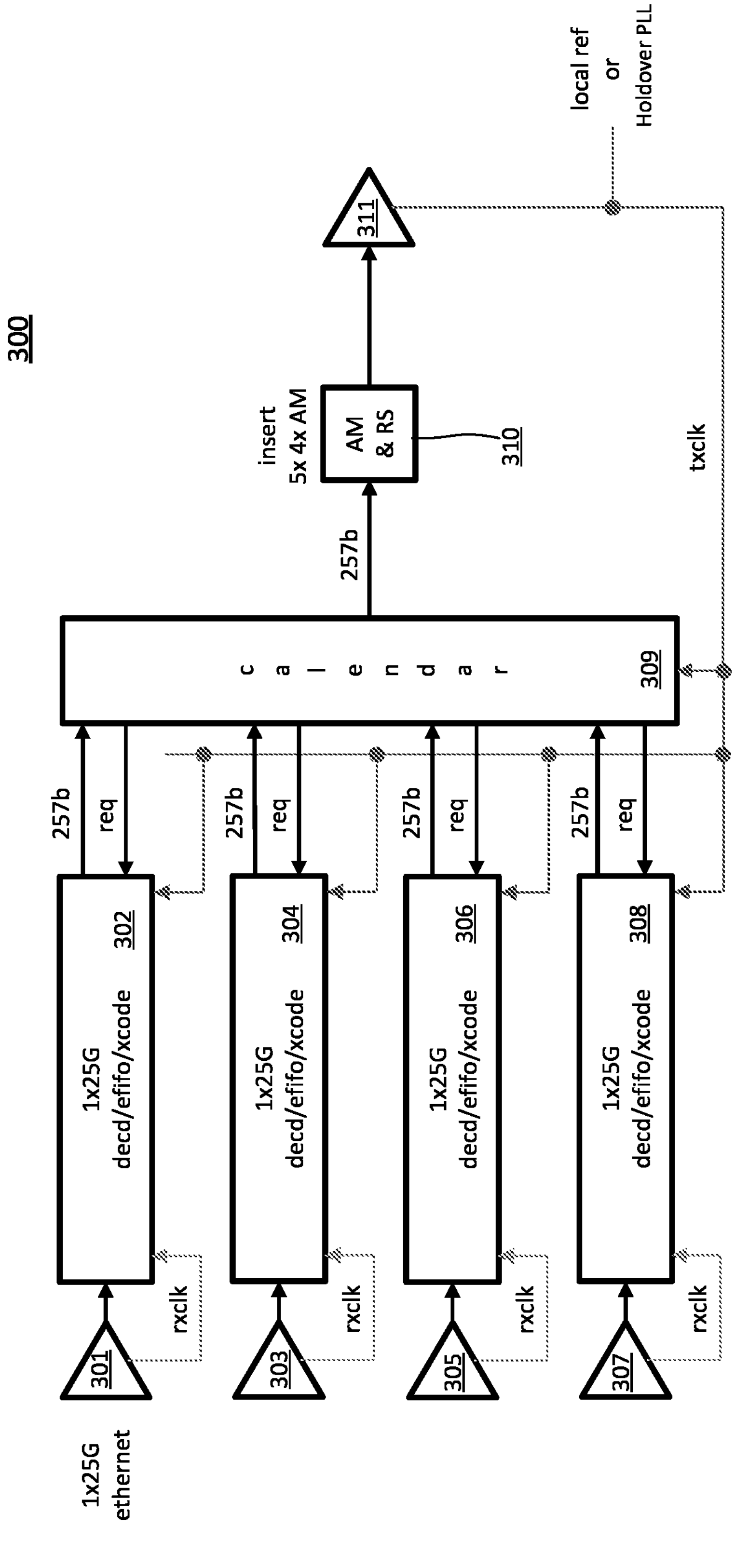
FIG. 3 is a simplified block diagram illustrating a switching device with four communication pipelines according to an embodiment of the present invention.

FIG. 3 is a simplified block diagram illustrating a switching device with four communication pipelines according to an embodiment of the present invention. This diagram is merely an example, which should not unduly limit the scope of the claims. One of ordinary skill in the art would recognize many variations, alternatives, and modifications. For example, switching device 300 is used to implement a muxponder with four 25 G ethernet connections. For simplicity of illustration, only one direction of the design is shown in FIG. 2 (i.e., multiplexing four independent 1×25 links into a single 1×100 G link) in the diagram. It is to be understood that switching device 300 is configured to receive 100 G data and de-multiplex data into 25 G data links as well.

Switching device 300 as shown includes four communication pipelines 302, 304, 306, and 308 that are respectively connected to receiver interfaces 301, 303, 305, and 307. For example, receiver interfaces 301, 303, 305, and 307 comprise serializer/deserialize (SerDes) devices for processing data received from network clients, which are independent from one another. One or more of the communication pipelines is configured to perform, among other functions, decoding, buffering (with eFIFO), and transcoding. For example, these pipelines, operating at 25 G data rate, are separate and independent and are configured to independent decode these four 25 G bit streams. This results in four independent streams of ethernet frames, the data rate of which may be at most +/−100 ppm offset from the others. For example, switching device 300 includes a mechanism to adapt the four independently-clocked receive streams into the same transmission data rate. For example, the four streams are sent into the four 1×25 pipelines using four independent receiver clocks ("rxclk"), but are configured on the output end using a single common transmitter clock ("txclk"). In certain embodiments, data go through a clock domain crossing (CDC) FIFO first, and the processing is done in the system clock domain.

Depending on the actual implementation and the network clients are connected to receiver interfaces 301, 303, 305, and 307, synchronization and clock signals can be configured in various ways. For example, if the four network clients connected to receiver interfaces 301, 303, 305, and 307 are synchronous (i.e., they all run off the same clock signal, with zero ppm among them), the system can save some latency across the buffers by deriving the transmit clock signal "txclk" from of one the receiver clock signals "rxclk" (e.g., through the "holdover PLL" signal); the latency is saved because no compensation is needed. In this configuration, only one of the "rxclk" signals is needed to drive the "txclk" signal. If the source of the "rxclk" signal used by the "txclk" signal is lost (e.g., the network client is down), the "txclk" signal can be switched to rely on a different "rxclk" signal. For example, the "holdover PLL" shown in FIG. 3 produces a "txclk" signal that tracks a given "rxclk" signal. If a tracked "rxclk" signal is down, the holdover PLL maintains its output frequency at the point of the shutdown; subsequently, another "rxclk" is chosen (by user or software). It is to be appreciated that the use of holdover PLL and reliance on "rxclk" signal can minimize latency; depending on the implementation, the "holdover PLL" may be omitted as well.

As explained above, the four communication pipelines may be configured differently to accommodate different communication protocols of the network clients. For example, each of the bit streams received at interfaces 301, 303, 305, and 307 nominally operates at the ethernet-standard 25.78125 Gb/s data rate (referred to as 25 G data rate), but each is allowed to deviate slightly from the actual precise data rate (e.g., +/−100 ppm according to IEEE 802.3 standards).

The four communication pipelines are coupled to calendar module 309 that multiplexes transcoded data blocks (e.g., 257-bits each) generated by these pipelines. Switching device 300 additionally includes alignment marker module 311 that generates alignment markers associated with the transcoded data blocks that are to be transmitted. Switching device 300 includes communication interface 311 that is configured to transmit (e.g., in 100 G data format) multiplexed data blocks provided by calendar 309. For example, interface 311 may provide a local reference clock signal. The operation of communication pipelines 302, 304, 306, and 308 is regulated by receiver clocks signals ("rxclk"), request ("req") from calendar module 309, and transmission clock signal ("txclk") from communication interface 311. For example, by requesting data from communication pipelines using its "req" signals, calendar module 309 can multiplex data blocks from these pipelines and alignment markers rom block 310.

Figure 4:
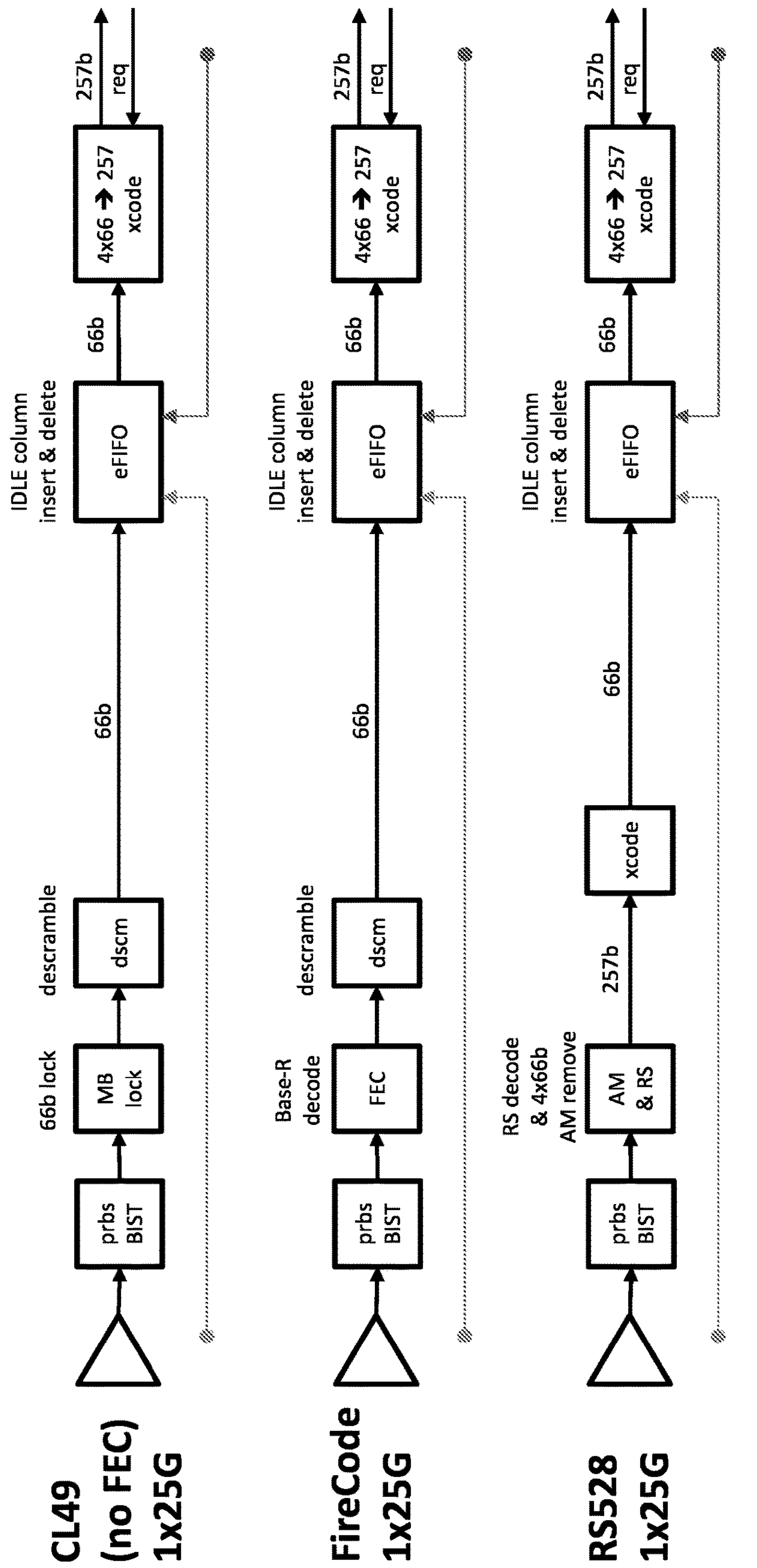
FIG. 4 is a simplified block diagram illustrating a communication pipelines according to an embodiment of the present invention.

FIG. 4 is a simplified block diagram illustrating a communication pipelines according to an embodiment of the present invention. This diagram is merely an example, which should not unduly limit the scope of the claims. One of ordinary skill in the art would recognize many variations, alternatives, and modifications. Communication pipelines 400 shows three different types of communication links, each having its own processing blocks. For example, users may use a controller (e.g., shown in FIG. 2) to configure the communication pipelines. In general, 66-bit decoded ethernet frames from 25 G data streams are sent into an elastic FIFO (eFIFO) of a communication pipeline. In various embodiments, 66-bit data blocks are decoded into 64-bit data blocks, which afford an additional granularity for data rate adjustment. Depending on the 25 G link, different types of decoding mechanisms are used. For example, the "CL49" pipeline includes three processing blocks: "prbs BIST" (random code generator for built-in self-test), "MB block" (66-bit lock), and "dscm" (descrambling). As an example, in the "FireCode" pipeline, there are "prbs BIST", "FEC" (e.g., based-R decoder), and "dscm" blocks. In yet another example with "RS528" pipeline, there are "prbs BIST", "AM & RS" (RS decoding and 4×66-bit alignment marker removal), "xcode" (transcoder) blocks. It is to be appreciated that other communication protocols may be used as well. For example, "prbs BIST" blocks may be omitted in various implementations. In various communication pipelines, an eFIFO buffer is configured to insert or delete IDLE "characters" (or other special characters permitted by the IEEE standard) within the ethernet data stream, to compensate for data rate differences between the eFIFO's input and its output. For example, an eFIFO comprises a buffer for storing data blocks and is coupled to receiver clock and/or transmitter clock. At the output of each eFIFO, the 25 G data stream is transcoded into 256 b/257 b format that is consistent with 100 G ethernet specification. In various implementations, communication pipelines take one 66-bit block from each data stream to form a 257 b block. And this process eliminates the need for buffering and simplifies the management of the four streams for multiplexing and distribution.

Figure 5:
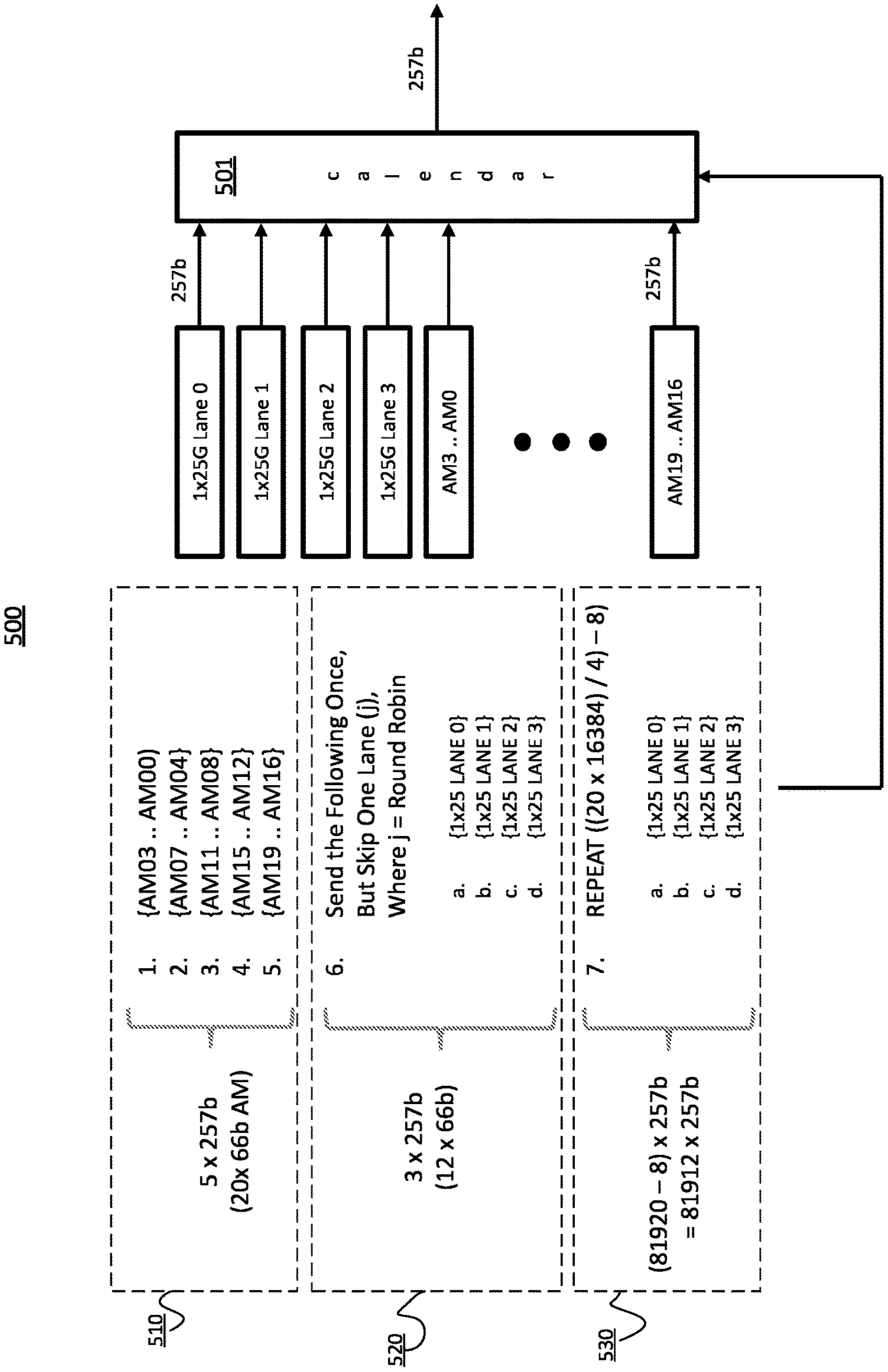
FIG. 5 is a simplified block diagram illustrating a multiplexing process according to an embodiment of the present invention.

FIG. 5 is a simplified block diagram illustrating a multiplexing process according to an embodiment of the present invention. This diagram is merely an example, which should not unduly limit the scope of the claims. One of ordinary skill in the art would recognize many variations, alternatives, and modifications. As explained above, a calendar module multiplexes data blocks from multiple 25 G data streams (e.g., 256-bit encoded) into a single data stream (e.g., 257 bits) for transmitting over a 100 G data link. For example, the term "calendar module" refers to a multiplexer device that use a calendar-based scheme to distribute data blocks. In various embodiments, the four 256-bit encoded streams (from 25 G links) are fed into a calendar-based multiplexor 501—in response to the "req" signal from multiplexer 501—to form a single 257-bit output data stream. In various implementations, the single output data stream is then sent through an IEEE-standard RS544 FEC encoder, to produce a single 100 Gb/s bit stream via a PAM SERDES transmitter.

For example, multiplexor 501 multiplexes 257-bit data blocks from the 25 G links with alignment markers. More specifically, calendar-based multiplexor 501 is collects 257-bit data blocks (with its "req" signals) from the four tributaries in a round robin fashion. For example, the output side of the calendar multiplexor operates a data rate that is at least four times of each of the tributaries, to maintain the 100 G output data rate. In certain implementations, there are fewer data streams; to keep output data consistent at 100 G, special characters (e.g., IDLE characters) are inserted or into or deleted from the output data stream. Alignment markers (AMs) are periodically inserted into the 100 G stream. For example, the AMs serve the purpose of delineating boundaries of FEC data blocks, and they are a requirement of the IEEE-standard 1×100 G RX544 FEC protection scheme. As shown in FIG. 5, twenty alignment markers form the first five 257-bit blocks (shown in block 510) occupies positions 1-5. At position 6 (shown in block 520), data blocks from lanes 0-3 are selected in a round robin fashion, wherein one lane is skipped. Next, at position 6 (shown in block 530), a large number (81912) of 257-bit blocks are transmitted.

It is to be noted that the periodic injection of AMs does not usually translate to increased output data rate, as special fill characters (e.g., IDLE characters created by eFIFO) can be replaced by AMs. Depending on the implementation, FEC parity may increase transmission data rate by 7%. In any case, the output data stream is compatible with 100 G data transmission protocols. For example, the actual transmission data rate of a 100 G CWDM link is 106.2500 Gb/s, which is approximately 7% higher than the aggregate receive rate on the 25 G side (4×25.78125 Gb/s). Furthermore, the eFIFO mechanism is effective in absorbing the periodic pausing in the read-out of their respective data streams, without over-running or under-running.

As an example, Table 1 below shows that the IEEE standard defines three different types of 1×25 G ethernet data streams. A person of ordinary skill in the art may recognize this as a mapping of 4× IEEE CL49 data streams into a single data stream resembling the CL82/CL91 interface in the IEEE standards.

TABLE 1

| | 1 × 25 no FEC | 1 × 25 BaseR FEC | 1 × 25 RS528 | 1 × 100 G RS544 PAM |
|---|---|---|---|---|
| baud rate | 25.78125 | 25.78125 | 25.78125 | 53.125 |
| bit rate | 25.78125 | 25.78125 | 25.78125 | 106.25 |
| # PCSL | 1 | 1 | 4 | 20 |
| # AM | none | none | 4 | 20 |
| AM interval | n/a | n/a | 4 × AM every 81920 × 66b (1024 FEC blocks) | 20 × AM every 20 × 16384 × 66b (4096 FEC blocks) |
| xcode | 64/66 | 64/66 → 64/65 | 64/66 → 256/257 | 64/66 → 256/257 |
| FEC | n/a | (2112, 2080) | (528, 514) | (544, 514) |
| effective bit rate | 25.78125/66 * 64 = 25.0000 Gb/s | 25.0000 Gb/s (zero overhead) | delete 4 IDLE columns every 81920 columns | delete 4 additional columns every 327680 columns |
| IEEE | CL49 | CL74 | CL91 | (802.3cd) |

For example, a 25 G data stream may be protected by BaseR FEC encoding, by RS528 FEC encoding, or not protected by no FEC. As shown in Table 1, the periodic AM intervals (or lack of AMs), as defined by the IEEE standard, do not cause undue stress on the eFIFO mechanism. It is to be appreciated that other multiplexing mechanisms may be implemented as well.

Figure 6:
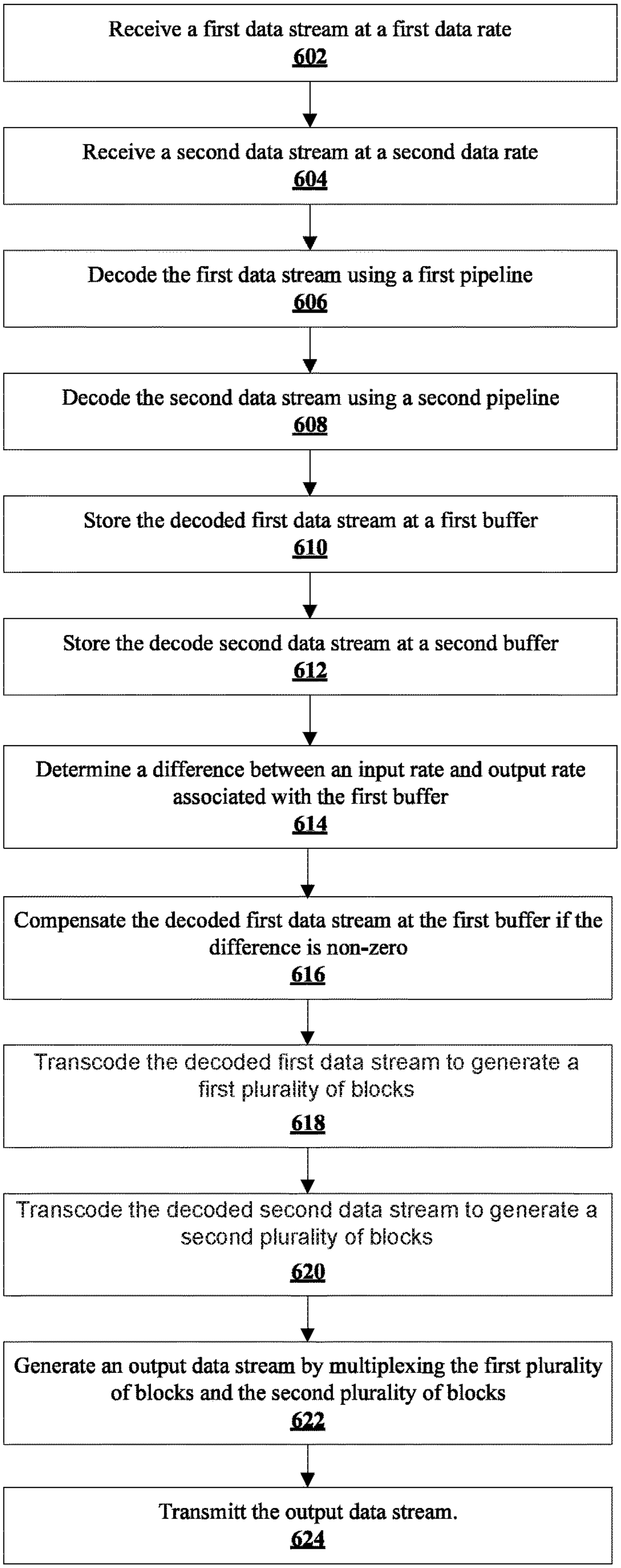
FIG. 6 is a simplified flowchart illustrating a communication method according to an embodiment of the present.

FIG. 6 is a simplified flowchart illustrating a communication method according to an embodiment of the present invention. This diagram is merely an example, which should not unduly limit the scope of the claims. One of ordinary skill in the art would recognize many variations, alternatives, and modifications. For example, one or more steps may be added, removed, repeated, modified, replaced, overlapped, and/or rearranged, and they should not limit the scope of claims.

As an example, the communication method 600 in FIG. 6 can be performed by the switching devices and their respective components illustrated in FIG. 2-5. At step 602, a first data stream at a first data rate is received. For example, a 25 G data stream is received from a first network entity. At step 604, a second data stream at a second data rate. For example, the second data stream is a 25 G data stream received from a second network entity. It is to be noted that there could be four 25 G data streams received from four network entities. At step 606, the first data stream is decoded using a first pipeline. At step 608, the second data stream is decoded using a second pipeline. There can be four pipelines configured for four 25 G data streams, and each of the pipeline is customized for the corresponding data stream. For example, a pipeline may additionally perform prbs built-in self-test (BIST) and descrambling, in addition to (or instead of) decoding. A pipeline may also include locking (e.g., MB lock) and alignment marker removal mechanisms.

At step 610, the decoded first data stream is stored at a first buffer. At step 612, the decode second data stream is stored at a second buffer. For example, each pipeline includes its own eFIFO buffer for storing the corresponding decoded data stream. At step 614, a difference between an input rate and output rate associated with the first buffer is determined. At step 616, the decoded first data stream at the first buffer is compensated if the difference is non-zero. For example, compensating the first data stream involves inserting or deleting special characteristics (e.g., IDLE characters) to compensate the difference in data rate. At step 618, the decode first data stream is transcoded to generate a first plurality of blocks. At step 620, the decoded second data stream is transcoded to generate a second plurality of blocks. For example, four pipelines may be used to transcode four data streams to generate the data blocks, which are provided to a multiplexor in response to a "req" signals. At step 622, an output data stream is by multiplexing the first plurality of blocks and the second plurality of blocks. For example, alignment markers may be multiplexed into the output data stream. At step 624, the output data stream is transmitted at, for example, 100 G data rate.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication device comprising:

a plurality of communication pipelines configured to receive respective input data streams; and a multiplexer coupled to the plurality of communication pipelines and configured to:

generate an output data stream by combining the input data streams;

insert, in response to one of the communication pipelines not working, one or more special characters into the output data stream to compensate for a difference between data rates of the input and output data streams; and an encoder configured to implement a parity scheme to increase a data rate of the output data stream relative to the input data streams.

2. The communication device of claim 1 wherein the multiplexer is configured to maintain independence of the respective input data streams from the plurality of communication pipelines in the output data stream.

3. The communication device of claim 1 wherein each of the communication pipelines is configured to receive the respective input data stream at a first data rate and wherein the multiplexer is configured to generate the output data stream for transmission at a second data rate that is greater than the first data rate.

4. The communication device of claim 3 wherein the communication pipelines are configured to operate based on one or more first clocks and wherein the multiplexer is configured to operate based on a second clock different from the one or more first clocks.

5. The communication device of claim 4 wherein the one or more first clocks are based on the first data rate and wherein the second clock is based on the second data rate.

6. The communication device of claim 4 wherein the second clock is derived from the one or more first clocks.

7. The communication device of claim 4 wherein the second clock is independent of the one or more first clocks.

8. The communication device of claim 3 wherein the communication pipelines are configured to insert or delete one or more characters in the respective input data streams to compensate for a difference between the first data rate and the second data rate.

9. The communication device of claim 3 wherein the communication pipelines are configured to insert or delete one or more characters in the respective input data streams in response to a variation in the first data rate.

10. The communication device of claim 3 wherein the communication pipelines are configured to insert or delete one or more characters in the respective input data streams to compensate for a variation in the first data rate.

11. The communication device of claim 1 wherein each of the communication pipelines is configured to receive the respective input data stream comprising first data blocks having a first format compatible for transmission at a first data rate, and wherein the multiplexer is configured to generate the output data stream comprising second data blocks having a second format compatible for transmission at a second data rate that is greater than the first data rate.

12. The communication device of claim 1 wherein the communication pipelines receive the respective input data streams with data rates offset from each other.

13. The communication device of claim 1 wherein the communication pipelines receive the respective input data streams with matching data rates.

14. The communication device of claim 1 wherein the communication pipelines operate asynchronously with the output data stream.

15. The communication device of claim 1 wherein the communication pipelines operate synchronously with the output data stream.

16. The communication device of claim 1 wherein the multiplexer is configured to multiplex the input data streams asynchronously to generate the output data stream.

17. The communication device of claim 1 wherein the multiplexer is configured to multiplex the input data streams synchronously to generate the output data stream.

18. The communication device of claim 1 wherein the multiplexer is configured to insert alignment markers delineating boundaries of data blocks in the output data stream.

19. The communication device of claim 1 wherein the multiplexer is configured to receive the respective input data streams from the communication pipelines using a round robin scheme.

* * * * *